United States Patent
Chou

(10) Patent No.: US 7,588,338 B2
(45) Date of Patent: Sep. 15, 2009

(54) KEYBOARD EQUIPPED WITH A BACKLIGHT STRUCTURE

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 209 days.

(21) Appl. No.: 11/288,258

(22) Filed: Nov. 29, 2005

(65) Prior Publication Data
US 2007/0121311 A1    May 31, 2007

(51) Int. Cl.
*H01H 9/18* (2006.01)
(52) U.S. Cl. .................. 362/24; 362/28; 362/29; 200/314
(58) Field of Classification Search .......... 362/23, 362/24, 85, 28, 29, 551, 554, 95; 200/314, 200/317
See application file for complete search history.

(56) References Cited

U.S. PATENT DOCUMENTS

| | | | |
|---|---|---|---|
| 5,975,711 A * | 11/1999 | Parker et al. | ............ 362/24 |
| 6,179,432 B1 | 1/2001 | Zhang et al. | |
| 6,199,996 B1 | 3/2001 | Katrinecz, Jr. et al. | |
| 6,284,988 B1 | 9/2001 | Watanabe et al. | |
| 6,322,229 B1 | 11/2001 | Chan et al. | |
| 6,554,442 B2 | 4/2003 | Chou | |
| 6,609,805 B1 * | 8/2003 | Nelson | ............ 362/30 |
| 6,860,612 B2 * | 3/2005 | Chiang et al. | ........ 362/29 |

FOREIGN PATENT DOCUMENTS

| | | |
|---|---|---|
| TW | 438035 Y | 5/2001 |
| TW | 465777 Y | 11/2001 |
| TW | 468833 Y | 12/2001 |
| TW | 509955 B | 11/2002 |
| TW | 516671 Y | 1/2003 |
| TW | 535385 Y | 6/2003 |
| TW | 570235 Y | 1/2004 |

* cited by examiner

*Primary Examiner*—Bao Q Truong
(74) *Attorney, Agent, or Firm*—Muncy, Geissler, Olds & Lowe, PLLC

(57) ABSTRACT

A keyboard equipped with a backlight structure includes a keyboard portion, a bridge board and a base board located beneath the keyboard portion to form a light transmission space. The bridge board has a light channeling portion to channel light entering the light transmission space to the keyboard portion where light emission is desired to refract the light. The structure can be made at a lower cost and converge light to display the keyboard portion without illuminating the entire keyboard portion.

13 Claims, 7 Drawing Sheets

KEYBOARD EQUIPPED WITH A BACKLIGHT STRUCTURE

FIELD OF THE INVENTION

The present invention relates to a keyboard equipped with a backlight structure and particularly to a keyboard that has a backlight structure below a keyboard portion to project light on the keyboard portion.

BACKGROUND OF THE INVENTION

Illuminated keyboards or backlit keyboards used in a low light or dark environment for desktop computers, laptop computers, notebook computers or Web TV sets are known in the art. Reference can be found in U.S. Pat. Nos. 6,284,988, 6,322,229, 6,199,996, 6,554,442 and 6,179,432, and R.O.C. patent publication Nos. 509955, 465777, 535385, 438035, 570235, 468833 and 516671. They mostly have a built-in luminous sheet to emit light to enable users to recognize the striking positions of the keyboard.

The aforesaid techniques have a common feature: the lighting element and the key cap are merely interposed by a trigger element and a moving mechanism. And the key cap, trigger element and moving mechanism are made from transparent material (some of them have opaque key caps with transparent character notations). The lighting element emits light from the entire sheet. The keyboard is illuminated evenly in a backlight fashion. Such a lighting mode creates problems in use, notably:

Illuminated keyboard mostly is used in a lower light or dark environment, such as on the airplane, in the car, and the like where luminance is not sufficient. With the entire keyboard illuminated, the total luminance is too strong and affects other people nearby. It the low light environment, user's visual recognition power decreases. In the occasion where the entire sheet is illuminated evenly, it is difficult for the user to recognize the individual notation on the key cap. Even if the character notation is made from opaque material, or the key cap is made from opaque material and the character notation is formed by transparent material, the light passes through between neighboring key caps and generates light interference and makes recognition difficult. For people who are not familiar the layout of character notations, striking mistakes frequently occur and erroneous output of instruction signals takes place.

SUMMARY OF THE INVENTION

Therefore the primary object of the present invention is to solve the aforesaid disadvantages. The present invention provides a backlight structure to converge light to the keyboard portion for illuminating without projecting light on the entire keyboard portion. The backlight structure of the invention includes a bridge board and a base board beneath the keyboard portion to form a light transmission space. Light entering the light transmission space passes through a light channeling portion located on the bridge board and in the light transmission space, and is directed to a corresponding location of the keyboard portion where light emission is desired to refract the light to the keyboard portion to emit light. Hence actual light emission scope on the keyboard portion is confined by the location and size of the light channeling portion.

Another object of the invention is to provide the light channeling portion and the bridge board that are made integrally by injection forming. The bridge board or the base board has a refraction surface to enhance the luminance of the lighting source. Hence a lower cost light source may be used to reduce the total cost of the backlight structure.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
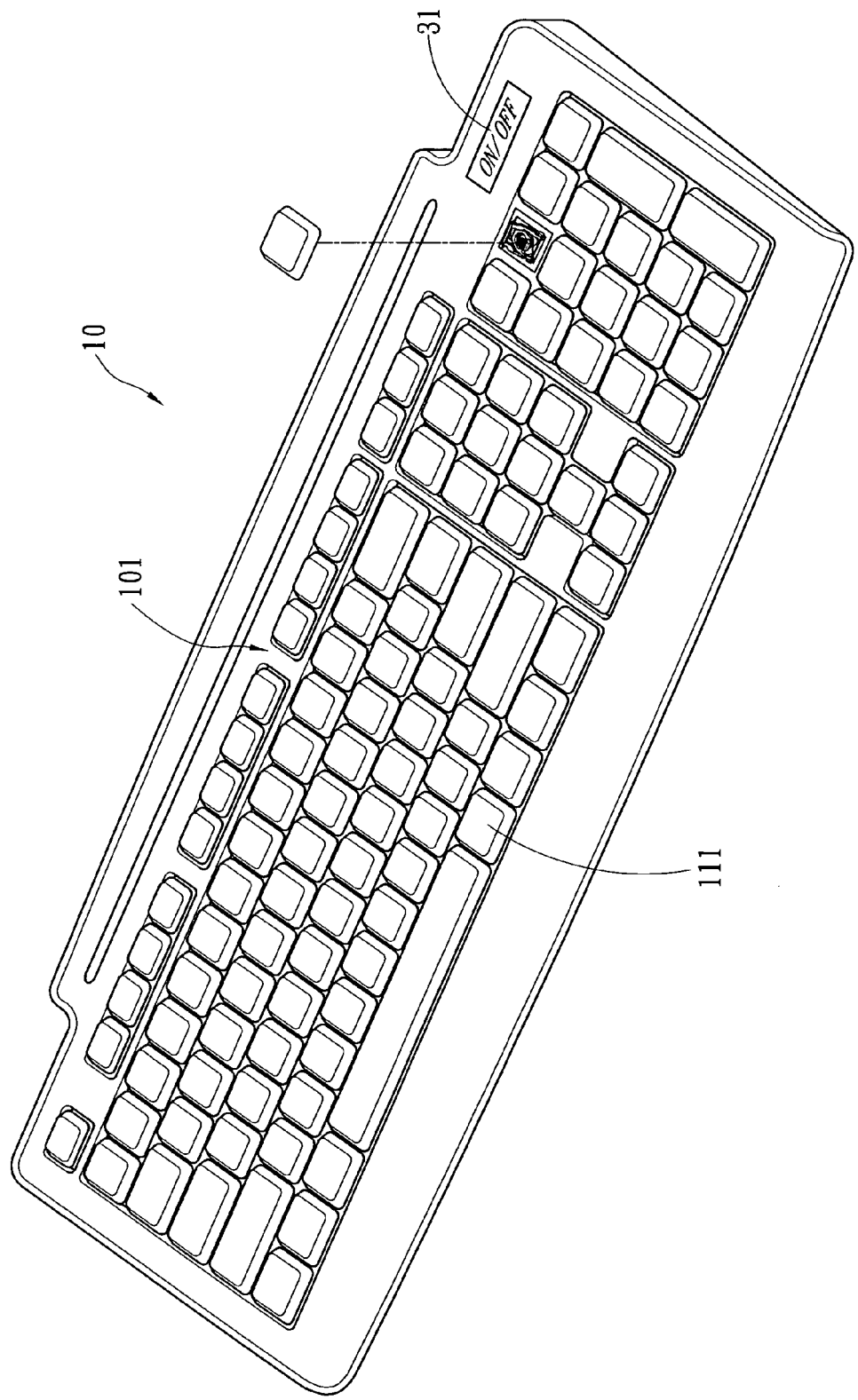
FIG. 1 is a perspective view of the keyboard of the present invention.
Figure 2:
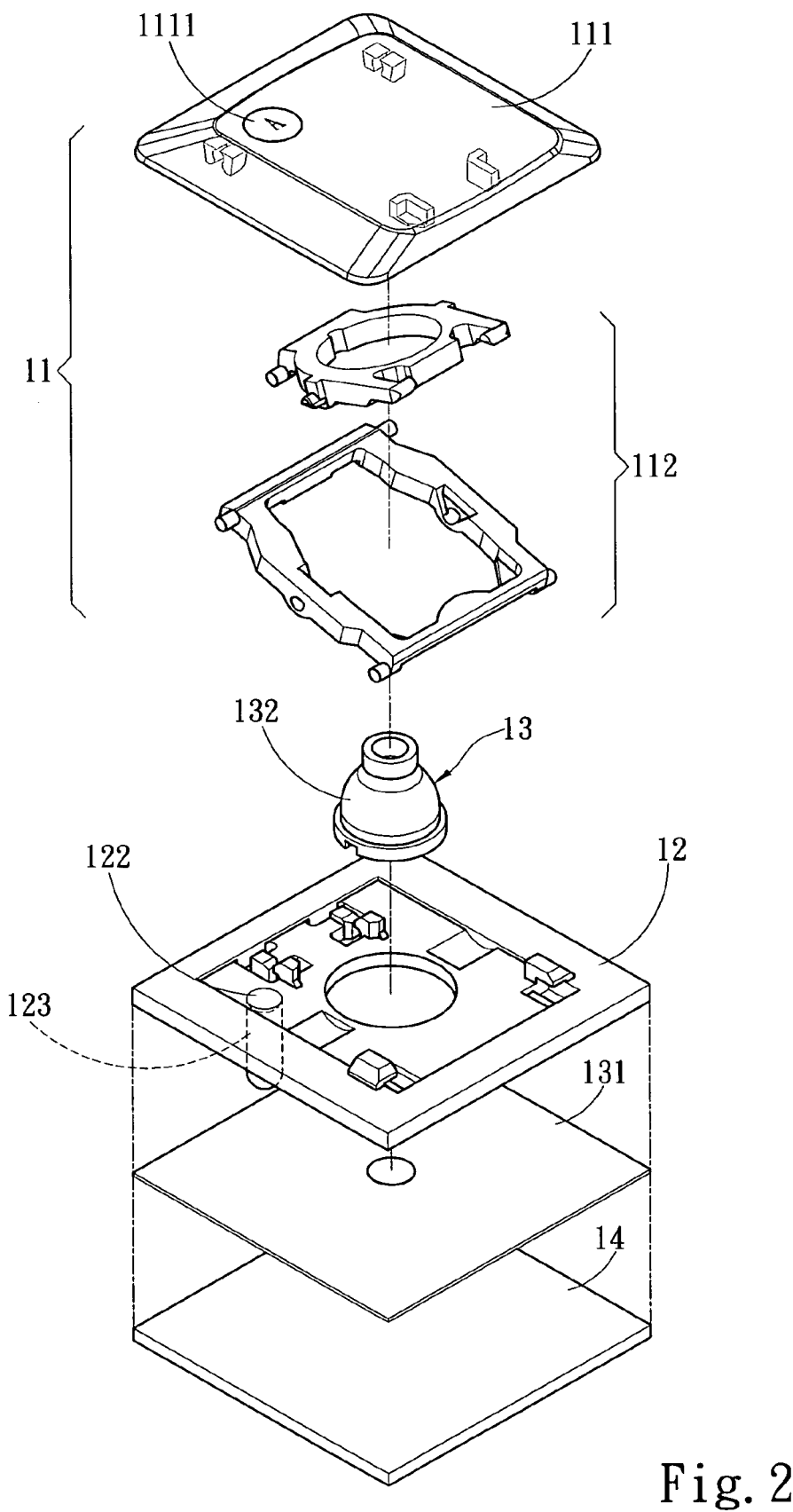
FIG. 2 is a fragmentary exploded view of the keyboard of the present invention.

Please referring to FIGS. 1, 2, 3A and 3B, the keyboard 10 equipped with a backlight structure according to the invention includes a keyboard portion 101 on a upper side that has a plurality of keys 11. Each key 11 has a key cap 111 with a notation 1111 formed on the surface and a moving mechanism 112 coupling with the key 111 to allow the key 111 to be depressed for a selected displacement. In an embodiment, the moving mechanism 112 is a scissors type mechanism, and has another end coupling with a bridge board 12 to allow the keyboard portion 101 to be depressed relative to the bridge board 12 for a selected distance. There is a signal triggering means 13 beneath the keyboard portion 101. The signal triggering means 13 includes a circuit board 131 and an actuation element 132 to be compressed by the keyboard portion 101 to trigger the circuit board 131 to output a signal. There is a base board 14 beneath the bridge board 12 spaced therefrom to form a light transmission space 20. The bridge board 12 has at least one light channeling portion 121 directing towards the light transmission space 20 and corresponding to the keyboard portion 101 where light emission is desired (such as the notation 1111). The light channeling portion 121 receives light emitted from light sources 30a and 30b and entered the light transmission space 20, and channels the light to the keyboard portion 101. Thus forms the backlight structure of the keyboard 10.

Figure 3A:
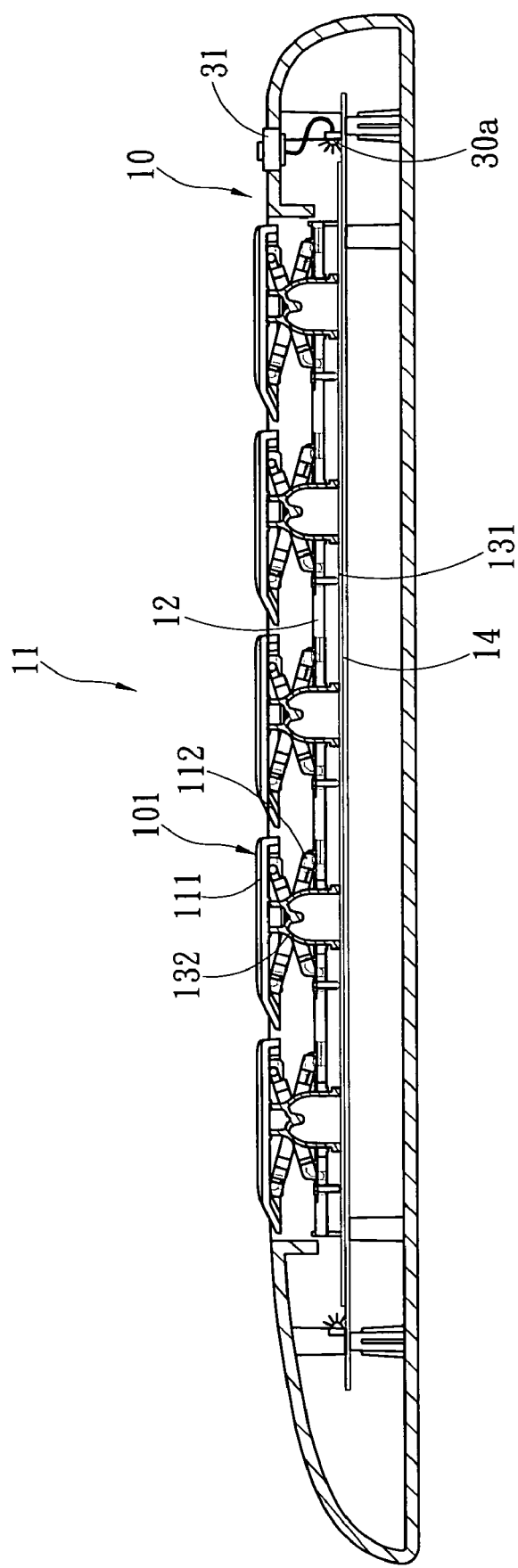
FIG. 3A is a sectional view of the keyboard of the present invention.
Figure 3B:
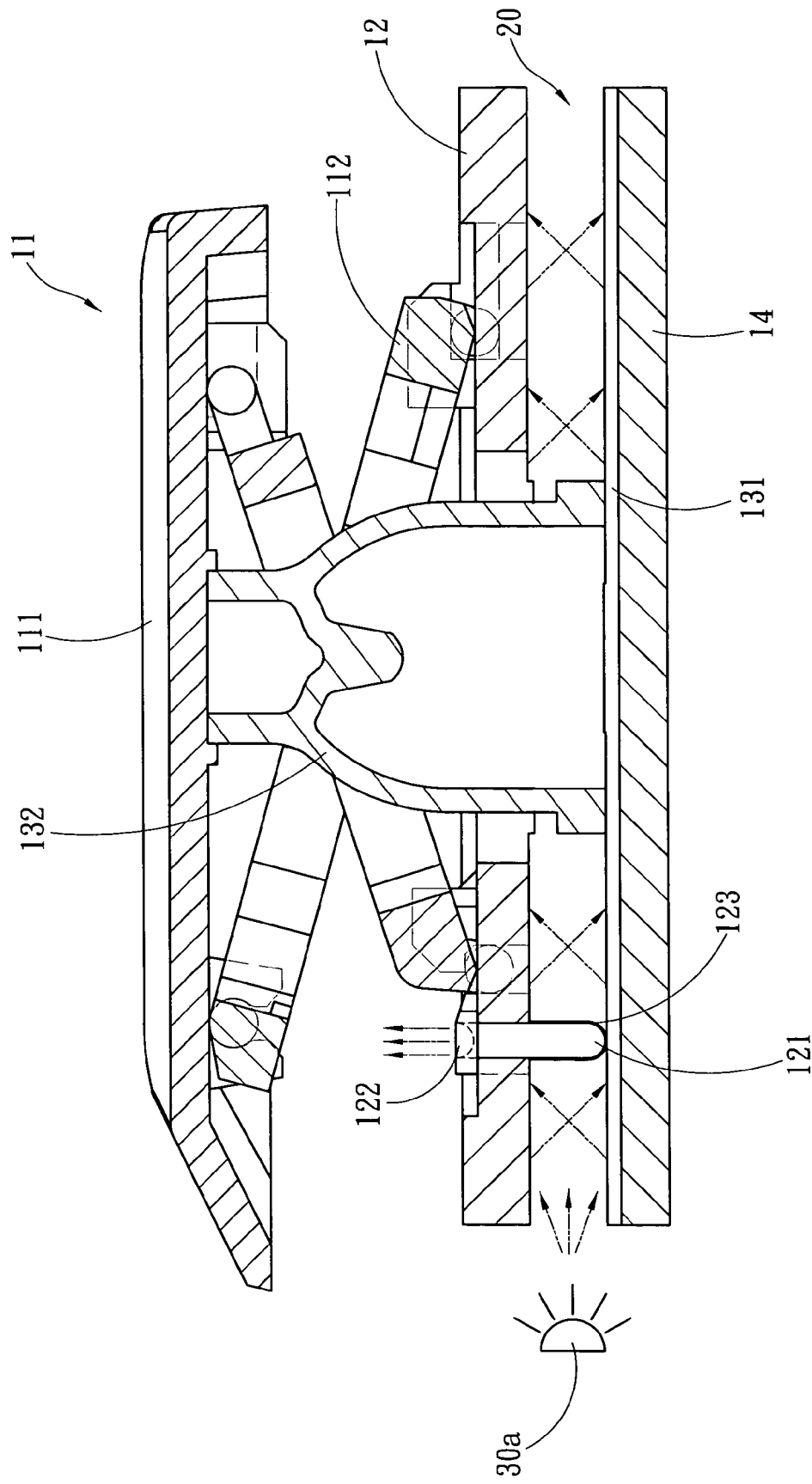
FIG. 3B is a fragmentary enlarged view according to FIG. 3A.
Figure 4:
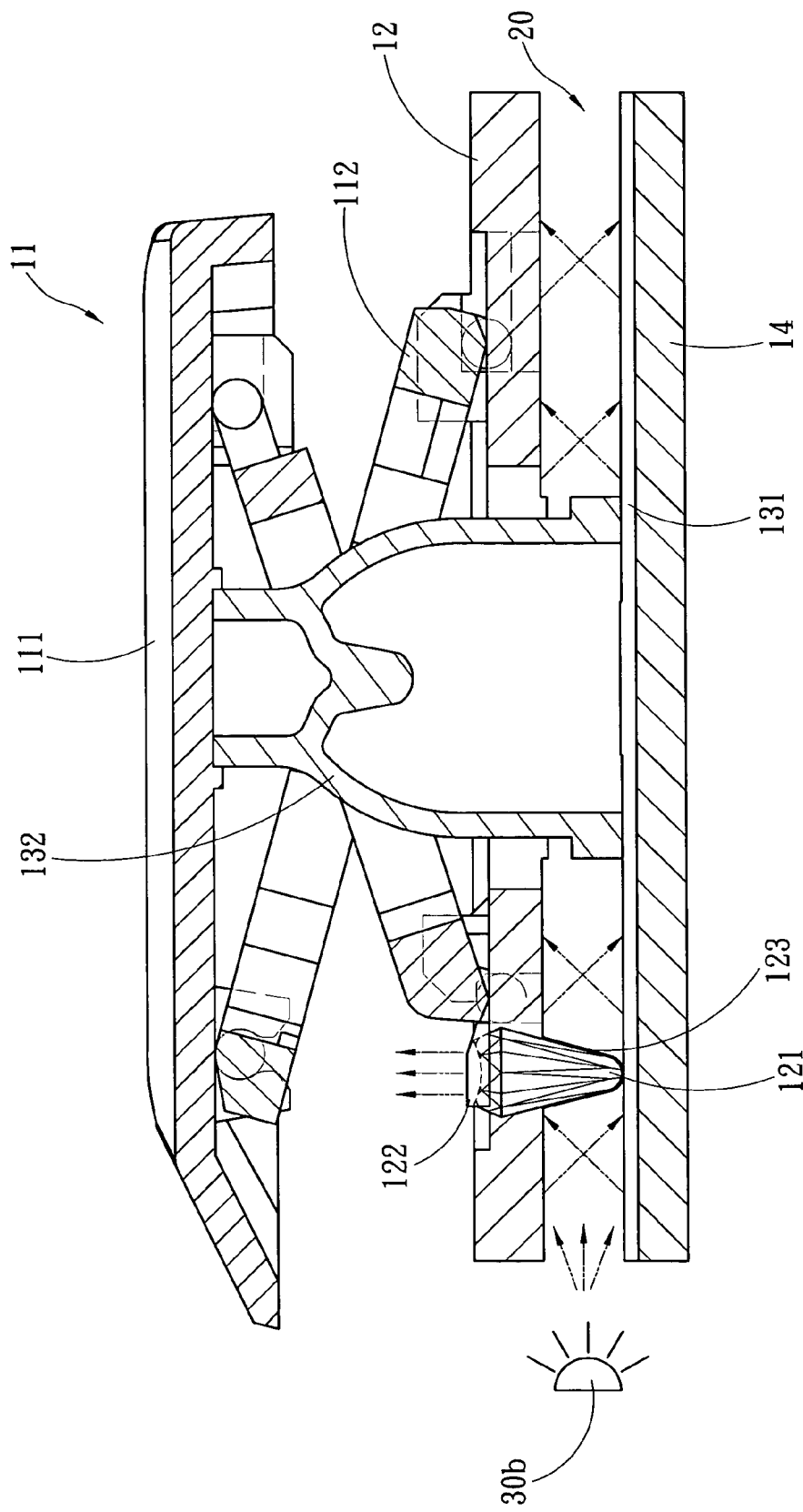
FIG. 4 is a schematic view of another embodiment of the present invention.

The light channeling portion 121 may be designed in a form according to the desired luminance of the keyboard portion 101, such as a cylindrical strut shown in FIG. 3B, or a polygon shown in FIG. 4. The light channeling portion 121 may further include a light sensitive member or light sensitive layer 123 to increase light absorption power or light refraction. In addition, the light channeling portion 121 has a light emission portion 122 on another end to converge or scatter light to the keyboard portion 101. In the event that light converging is adopted, light is focused on the notation 1111 of the key cap 111. The notation 1111 may be formed by carving or transparent to emit light for easy recognition. In the event that light scattering is adopted, the light is projected to the scope of the key cap 111, and the key cap 111 is made from a transparent material. Either way, the light is projected to a single key cap 111. The area between neighboring key caps 111 does not receive light. Thus total illumination of the entire body can be avoided, and striking of the key 11 can be performed accurately. Moreover, the light channeling portion 121 may be extended to the base board 14. Aside from providing light refraction, it also can aid bracing of the bridge board 12 to achieve a firmer anchoring effect.

Figure 5A:
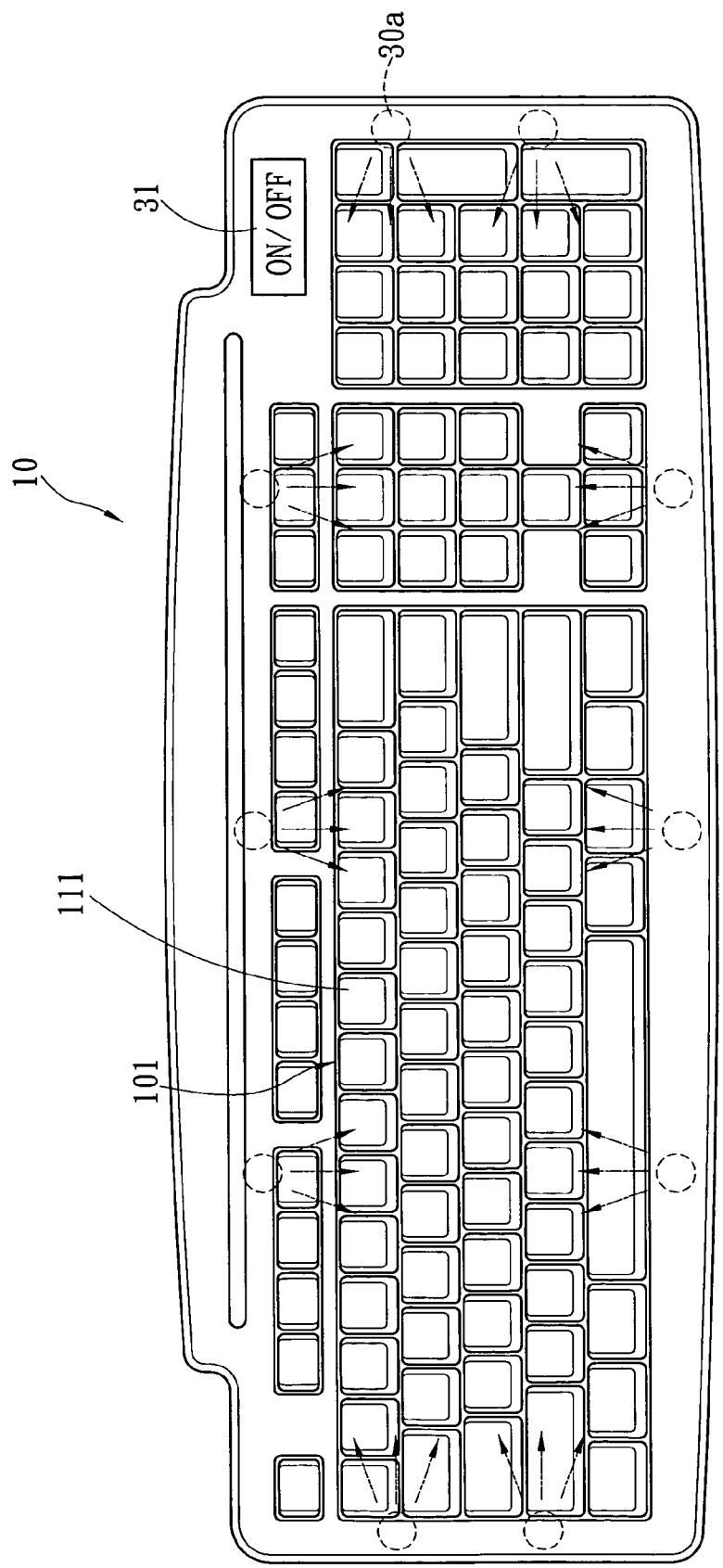
FIGS. 5A and 5B are schematic views of the light sources of the present invention.
Figure 5B:
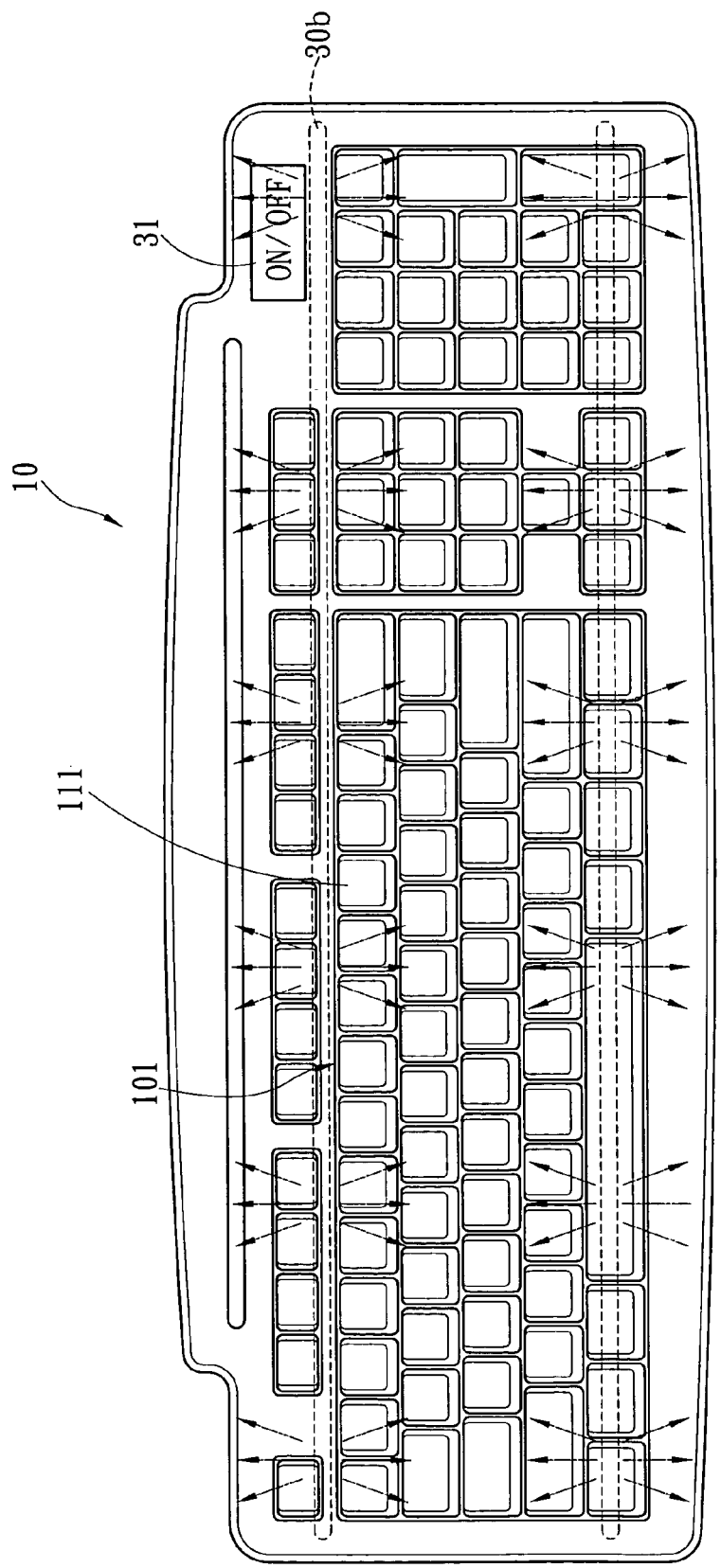

Referring to FIGS. 5A and 5B, because of the invention provides the light transmission space 20, the light sources 30a and 30b do not have to be formed in an entire sheet. As shown in FIG. 5A, the light source 30a is located on the peripheral side of the keyboard portion 101. Referring to FIG. 5B, the emission light source 30b is located beneath the keyboard portion 101 and formed in a plate located in the light transmission space 20. The light sources 30a and 30b further can be connected to a power supply switch 31 outside the keyboard 10. To enhance reflection of the light sources 30a and 30b to increase the luminance in the light transmission space 20, at least one refraction surface is formed on the bottom surface of the bridge board 12 and the surface of the base board 14 (if the circuit board 131 is located in the light transmission space 20, at least one refraction surface is formed on the bottom surface of the bridge board 12 and the surface of the base board 14 located in the light transmission space 20. If multiple actuation elements 132 are connected to a MYLAR sheet located in the light transmission space 20, then at least one refraction surface is formed on the bottom surface of the bridge board 12 and the surface of the MYLAR sheet located in the light transmission space 20). Hence light emitted from the light sources 30a and 30b and entered the light transmission space 20 has a greater luminance through the refraction surface. If the light sources 30a and 30b already have a sufficient luminance, to avoid external light from interfering the light in the light transmission space 20 in the upward direction, the bottom surface of the bridge board 12 and the surface of the base board 14 in the light transmission space 20 may be formed in an opaque mask surface. Thereby the light sources 30a and 30b in the light transmission space 20 can project light only through the light channeling portion 121 to the keyboard portion 101 to emit light.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A keyboard equipped with a backlight structure, comprising:
    a keyboard portion which has a plurality of keys, each of the keys including a key cap which has a surface formed with a notation for emitting light and a moving mechanism coupling with the key cap to allow the key cap to be depressed for a selected displacement;
    a bridge board coupling with another end of the moving mechanism to allow the keyboard portion to be depressed against the bridge board for a selected distance;
    a signal triggering means which includes a circuit board and an actuation element compressible by the keyboard portion to trigger the circuit board to output a signal; and
    a base board located beneath the bridge board and spaced therefrom to form a light transmission space;
    wherein the bridge board has at least one light channeling portion extending into the light transmission space and corresponding to the notation on the keyboard portion, the light channeling portion receiving light entering the light transmission space from a light source and channeling the light to the notation on the keyboard portion.

2. The keyboard equipped with a backlight structure of claim 1, wherein the bridge board has a bottom surface and the base board has a surface located in the light transmission space that form at least one refractive surface.

3. The keyboard equipped with a backlight structure of claim 1, wherein the bridge board has a bottom surface and the base board has a surface located in the light transmission space that are opaque mask surfaces.

4. The keyboard equipped with a backlight structure of claim 1, wherein the circuit board is located in the light transmission space, the bridge board having a bottom surface and the base board having a surface located in the light transmission space that form at least one refractive surface.

5. The keyboard equipped with a backlight structure of claim 1, wherein the actuation element includes multiple sets connecting to a polyester sheet which is located in the light transmission space, the bridge board having a bottom surface and the polyester sheet having a surface located in the light transmission space that form at least one refractive surface.

6. The keyboard equipped with a backlight structure of claim 1, wherein the light channeling portion has another end forming a light emission portion to converge or scatter light.

7. The keyboard equipped with a backlight structure of claim 1, wherein the light channeling portion has a light sensitive layer.

8. The keyboard equipped with a backlight structure of claim 1, wherein the light source is located on the periphery of the keyboard portion.

9. The keyboard equipped with a backlight structure of claim 1, wherein the light channeling portion is extended to couple with the base board to aid anchoring of the bridge board.

10. The keyboard equipped with a backlight structure of claim 1, wherein the light source is located in the light transmission space beneath the keyboard portion.

11. The keyboard equipped with a backlight structure of claim 10, wherein the light source is a plate-shaped light source located in the light transmission space.

12. The keyboard equipped with a backlight structure of claim 1, wherein the light source is connected to a power supply switch located outside the keyboard.

13. A keyboard equipped with a backlight structure, comprising:
    a keyboard portion which has a plurality of keys, each of the keys including a key cap which has a surface formed with a notation and a moving mechanism coupling with the key cap to allow the key cap to be depressed for a selected displacement;
    a bridge board coupling with another end of the moving mechanism to allow the keyboard portion to be depressed against the bridge board for a selected distance;
    a signal triggering means which includes a circuit board and an actuation element compressible by the keyboard portion to trigger the circuit board to output a signal; and
    a base board located beneath the bridge board and spaced therefrom to form a light transmission space;
    wherein the bridge board has at least one light channeling portion directing towards the light transmission space and corresponding to the keyboard portion on a location where light emission is desired, the light channeling portion receiving light entered the light transmission space from a light source and channeling the light to the keyboard portion,
    wherein the actuation element has a vertical cross-section having a shape of an inverted "W", and
    wherein the light channeling portion is extended to couple with the base board to aid anchoring of the bridge board.

* * * * *